(12) United States Patent
Ikeya et al.

(10) Patent No.: US 10,907,573 B2
(45) Date of Patent: Feb. 2, 2021

(54) THERMALLY INSULATED INSERT MEMBER AND ENGINE HAVING SAME

(71) Applicant: HONDA MOTOR CO., LTD., Tokyo (JP)

(72) Inventors: Kenichiro Ikeya, Wako (JP); Satoshi Yamamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/342,792

(22) PCT Filed: Oct. 2, 2017

(86) PCT No.: PCT/JP2017/035788
§ 371 (c)(1),
(2) Date: Apr. 17, 2019

(87) PCT Pub. No.: WO2018/074205
PCT Pub. Date: Apr. 26, 2018

(65) Prior Publication Data
US 2020/0049059 A1    Feb. 13, 2020

(30) Foreign Application Priority Data

Oct. 21, 2016 (JP) .................................. 2016-206487

(51) Int. Cl.
*F02F 1/42* (2006.01)
*F02B 31/08* (2006.01)
*F02B 31/04* (2006.01)

(52) U.S. Cl.
CPC ............ *F02F 1/4257* (2013.01); *F02B 31/04* (2013.01); *F02B 31/08* (2013.01); *F02F 1/4242* (2013.01)

(58) Field of Classification Search
CPC ......... F02B 31/08; F02B 31/04; F02F 1/4242; F02F 1/4257
(Continued)

(56) References Cited

U.S. PATENT DOCUMENTS 5,303,688 A    4/1994 Chiuminatta et al.
6,178,094 B1    1/2001 Hakozaki
(Continued)

FOREIGN PATENT DOCUMENTS

JP    H08-501734 A    2/1996
JP    H08-296535 A    11/1996
(Continued)

OTHER PUBLICATIONS

JP2007113482 (Nakawatase) May 10, 2007 (online translation) [retrieved on Mar. 5, 2020] retrieved from espacenet website (Year: 2020).*

(Continued)

*Primary Examiner* — Mahmoud Gimie
(74) *Attorney, Agent, or Firm* — Rankin, Hill & Clark LLP

(57) ABSTRACT

Provided is a thermally insulated insert member and an engine having the thermally insulated insert member. Thermally insulated insert member is disposed in an intake port of a cylinder head of the engine. The thermally insulated insert member includes a guide member that guides a flow of intake air flowing in t he intake port; and a thermally insulative support member with a shape that can be fitted within the intake port. The guide member is formed of a metal and is supported in the intake port via the thermally insulative support member.

12 Claims, 9 Drawing Sheets

(58) Field of Classification Search
USPC ......................................................... 123/308
See application file for complete search history.

(56) References Cited

U.S. PATENT DOCUMENTS

| | | | |
|---|---|---|---|
| 2002/0078921 A1 | 6/2002 | Kim et al. | |
| 2003/0150431 A1 | 8/2003 | Oota | |
| 2004/0211390 A1 | 10/2004 | Kim et al. | |
| 2010/0294228 A1* | 11/2010 | Kameda | F02B 31/08 123/184.56 |

FOREIGN PATENT DOCUMENTS

| | | | |
|---|---|---|---|
| JP | H11-13564 A | | 1/1999 |
| JP | 2000-049475 A | | 2/2000 |
| JP | 2002-201948 A | | 7/2002 |
| JP | 2003-239750 A | | 8/2003 |
| JP | 2007-071129 A | | 3/2007 |
| JP | 2007-113482 A | | 5/2007 |
| JP | 2007239659 A | * | 9/2007 |
| JP | 2007-297952 A | | 11/2007 |
| JP | 2008-151078 A | | 7/2008 |
| JP | 2008151078 A | * | 7/2008 |
| JP | 4728195 B2 | | 7/2011 |
| JP | 2015-190336 A | | 11/2015 |
| JP | 2016-118132 A | | 6/2016 |

OTHER PUBLICATIONS

Japanese Office Action received in corresponding Japanese application No. 2018-546227 dated Jan. 14, 2020 with English translation (10 pages).

International Search Report with English Translation by ISA/JP dated Jan. 9, 2018, on PCT/JP2017/035788 (5pages).

Written Opinion by ISA/JP dated Jan. 9, 2018, on PCT/JP2017/035788 (5pages).

* cited by examiner

Forward ←→ Rearward

THERMALLY INSULATED INSERT MEMBER AND ENGINE HAVING SAME

TECHNICAL FIELD

The present invention relates to a thermally insulated insert member disposed in an intake port and an engine having same

BACKGROUND ART

Conventionally, there is known an air intake device including: an intake port provided in a cylinder head of an engine; and a tumble plate partitioning the intake port into two passages, wherein one of the two passages is configured to be opened and closed at the intake-air upstream side of the passage by a predetermined valve (see, for example, Patent Literature 1).

This air intake device closes the one passage and allows intake air to flow through the other passage into the cylinder obliquely. The engine provided with this air intake device can generate a tumble (vertical swirl) in the combustion chamber and thereby improve fuel consumption. This air intake device opens the valve to allow intake air to flow through both the passages into the cylinder. With this operation, the engine increases the amount of the intake air to increase the output power.

PRIOR ART DOCUMENT

Patent Literature

Patent Literature 1: Japanese Patent Publication No. 4728195

SUMMARY OF INVENTION

Problems to be Solved by Invention

According to the conventional air intake device (see, for example, Patent Literature 1), the tumble plate is directly attached to an inner wall surface of the intake port by, for example, embedding opposite edges of the tumble plate in the inner wall. Thus, the tumble plate receives heat via the cylinder head from a combustion chamber ceiling surface having high temperature. As a result, the amount of the heat transmitted to the intake port increases and thus the temperature of the intake port increases. An increase in the temperature of the intake port decreases the intake charge efficiency.

An object of the present invention is to provide an engine provided with a thermally insulated insert member capable of reducing the increase in the temperature of the intake port in comparison with conventional arts.

Solution to Problem

To achieve the above-described object, a thermally insulated insert member of the present invention is disposed in an intake port of a cylinder head of an engine and is provided with a guide member that guides the flow of intake air in the intake port.

The engine of the present invention is provided with the thermally insulated insert member.

Advantageous Effects of Invention

The present invention provides a thermally insulated insert member capable of reducing the increase in the temperature of the intake port in comparison with conventional arts and provides an engine provided with the thermally insulated insert member.

BRIEF DESCRIPTION OF THE DRAWINGS

FIG. 8A is a conceptual view showing the flow of the intake air when a second intake passage is closed by a tumble control valve.

FIG. 8B is a conceptual view showing the flow of the intake air when the second intake passage is opened by the tumble control valve.

DESCRIPTION OF EMBODIMENTS

An embodiment for carrying out the present invention (hereinafter referred to as "present embodiment") will be described in detail.

A thermally insulated insert member of the present invention has a guide member for guiding intake air from an intake manifold of an engine toward a combustion chamber in a predetermined direction. This guide member is disposed in an intake port so as to be thermally insulated from the cylinder head.

Hereinafter, a description will be given of the whole structure of an engine provided with this thermally insulated insert member and then a description will be given of the thermally insulated insert member.

Engine

An explanation of the present embodiment is given taking a spark-ignition inline three-cylinder engine mounted on a vehicle as an example. However, the present invention is not limited as to the number of cylinders, cylinder arrangement, ignition method of the engine and the like.

Figure 1:
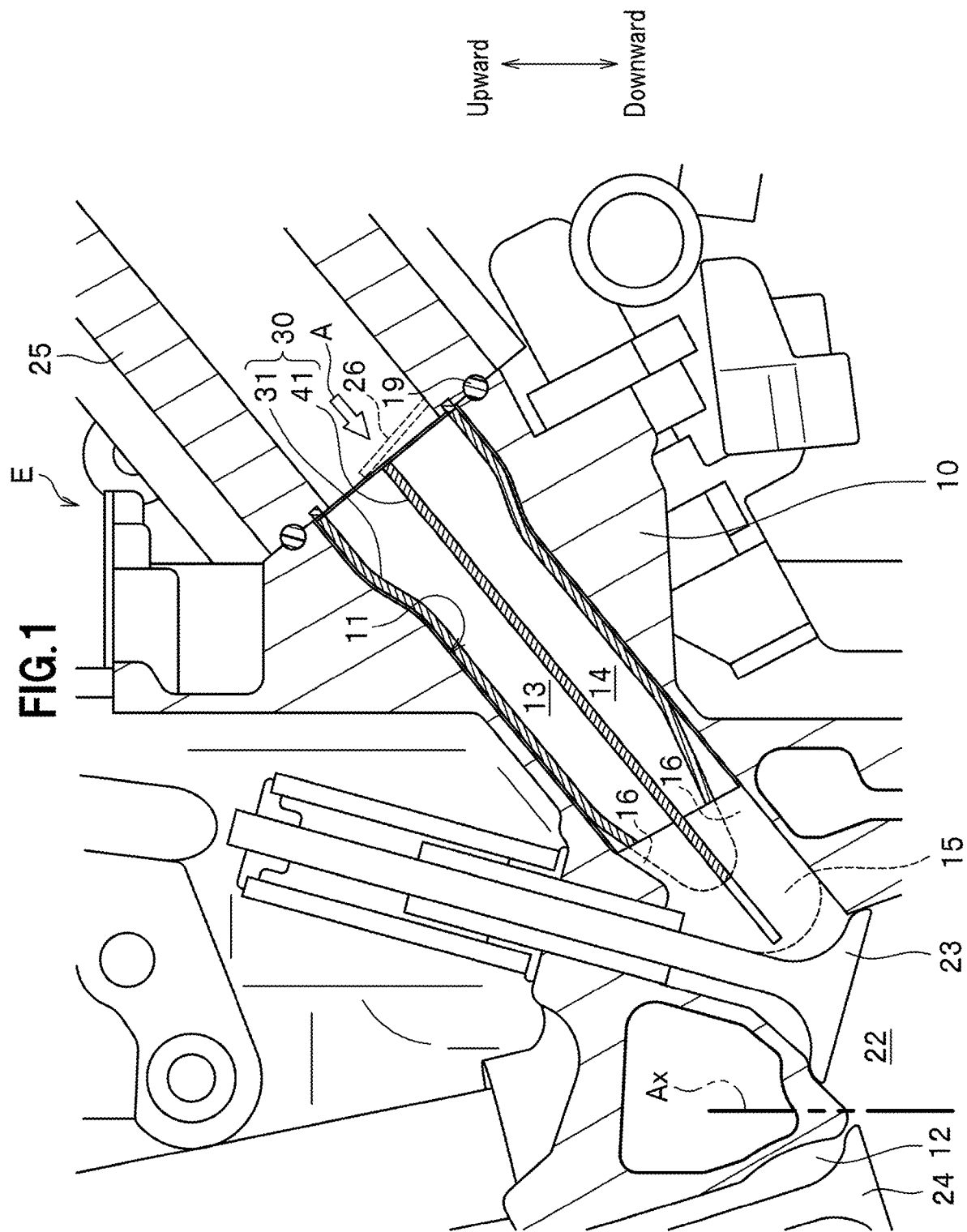
FIG. 1 is a partially enlarged cross-sectional view of an engine including an intake port provided with a thermally insulated insert member, showing the intake port and the vicinity thereof.

FIG. 1 is a partially enlarged cross-sectional view of an engine E including an intake port 11 provided with a thermally insulated insert member 30, showing the intake port 11 and the vicinity thereof. It should be noted that the upward-downward direction mentioned in the descriptions below corresponds to the upward-downward direction of the engine E mounted on a vehicle, which is indicated as the arrows shown in FIG. 1.

As shown in FIG. 1, the engine E of the present embodiment has a cylinder head 10 in which an intake port 11 and an exhaust port 12 are formed and a cylinder block (not shown) to which this cylinder head 10 is attached.

Although not shown, the above-mentioned cylinder block defines cylinder bores each with a circular columnar space in which a piston is arranged, as is well-known. The cylinder block of the inline three-cylinder engine has three cylinder bores.

A crankcase disposed below the cylinder block rotatably supports a crankshaft to which the pistons are each coupled via a connecting rod.

The cylinder head 10 defines lower surfaces which respectively face the cylinder bores (not shown) and on each of which a ceiling portion of a corresponding combustion chamber 22 is formed. This ceiling portion is formed in a gable roof shape, which is so called pent roof type.

A spark plug (not shown) is disposed on each ceiling portion of the cylinder head 10 so as to face the corresponding combustion chamber 22.

Each intake port 11 is a hole formed in the cylinder head 10 to supply intake air from an intake manifold 25 into the corresponding combustion chamber 22. The intake port 11 extends in the cylinder head 10 in a direction inclined with respect to an axial line Ax of the circular columnar space forming the cylinder bore. The intake port 11 extends in the cylinder head 10 from the intake manifold 25, located upstream of the intake air and above the combustion chamber 22, toward the combustion chamber 22, located downstream of the intake air, so as to incline.

Inserted in the intake port 11 is a thermally insulated insert member 30 having a guide member 41 that guides intake air as described later.

Figure 2:
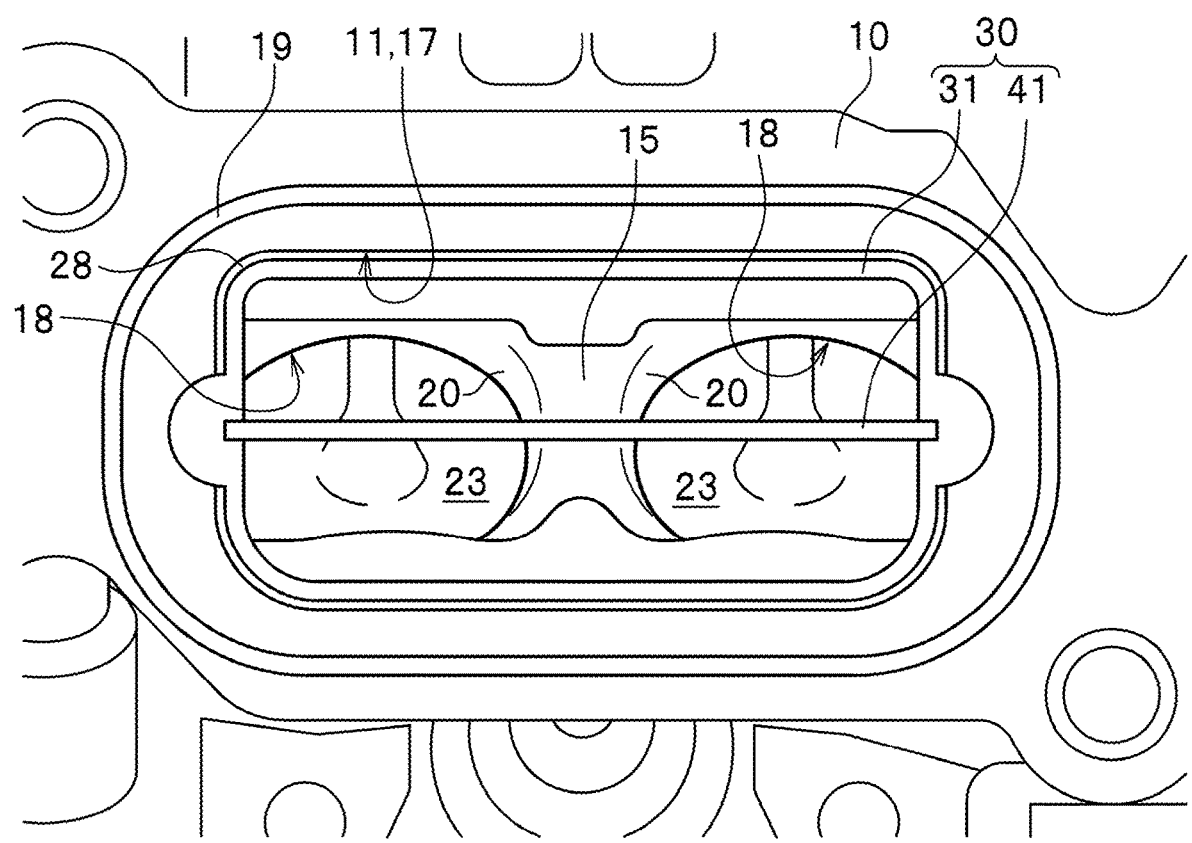
FIG. 2 is a view as viewed from the direction of arrow A in FIG. 1, showing the thermally insulated insert member inserted into the intake port from an end surface side of the cylinder head.

FIG. 2 is a view as viewed from the direction of arrow A in FIG. 1, showing the thermally insulated insert member 30 inserted from an end surface side of the cylinder head 10 into the intake port 11.

In FIG. 2, the reference sign 28 indicates a clearance formed between an inner wall surface of the intake port 11 and the thermally insulated insert member 30. The reference sign 31 indicates a thermally insulative support member of the thermally insulated insert member 30, which is described later in detail. The reference sign 41 indicates the guide member of the thermally insulated insert member 30. The reference sign 23 indicates an intake valve seen through and located ahead of a downstream opening 18 of the intake port 11 (branch passages 20).

As shown in FIG. 2, an upstream opening 17 of the intake port 11 is formed on an end surface of the cylinder head 10 that is on the side of the intake manifold 25 (see FIG. 1).

The upstream opening 17 is formed so as to correspond to the shape of an opening of the intake manifold 25 (see FIG. 1) that is located on an intake-air downstream side of the intake manifold 25. Incidentally, the upstream opening 17 according to the present embodiment has a substantially rectangular shape with four rounded corners.

The intake port 11 branches at a branch point 15 into plural (two in the present embodiment) branch passages 20 extending from the upstream side toward the downstream side of the intake air (from the front side toward the back side of the drawing sheet of FIG. 2).

The downstream opening 18 of each branch passage 20 faces the combustion chamber 22 (see FIG. 1) and has a circular shape.

Figure 3:
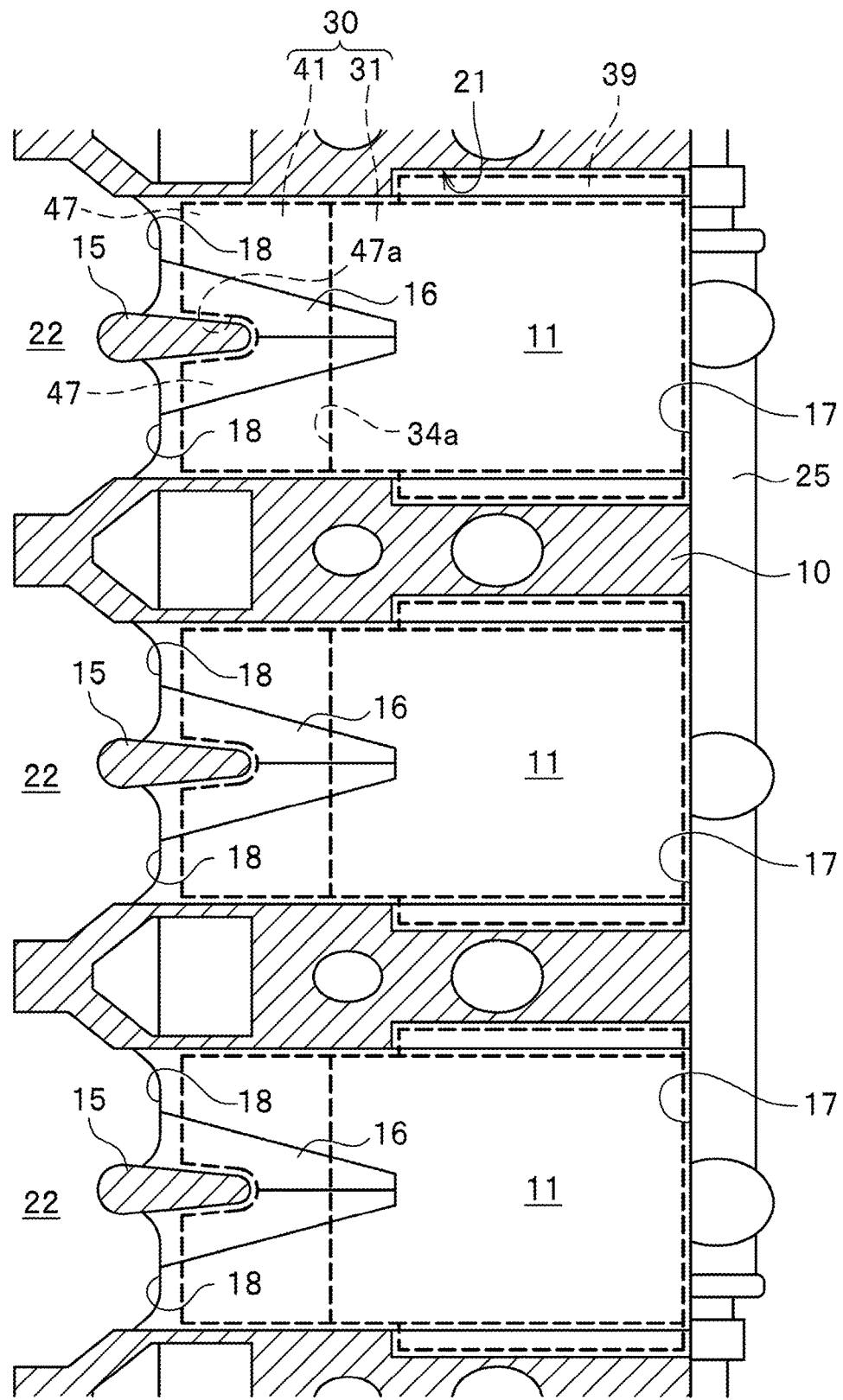
FIG. 3 is a cross-sectional view of the intake port in which the thermally insulated insert member is disposed.

FIG. 3 is a cross-sectional view of the cylinder head 10 and will be referred to for explaining the structure of the intake ports 11. Incidentally, in FIG. 3, the thermally insulated insert members 30 disposed in the intake ports 11 are indicated with dotted lines for the convenience of illustration.

As shown in FIG. 3, the three intake ports 11 are formed so as to be arranged in a line in a direction in which the three combustion chambers 22 of the cylinder head 10 are arranged (in a direction perpendicular to the drawing sheet in FIG. 1). Incidentally, as described above, these combustion chambers 22 are formed to correspond to the three cylinder bores formed in the cylinder block (not shown).

Each intake port 11 has the upstream opening 17 on the intake manifold 25 side, which is on the intake-air upstream side, and has the downstream opening 18 on the combustion chamber 22 side, which is on the intake-air downstream side.

Each intake port 11 has a pair of grooves 21 formed for receiving later-described protrusions 39 of the corresponding thermally insulated insert member 30.

The grooves 21 support the thermally insulated insert member 30 on the intake port 11 via the protrusions 39 fitted into the grooves 21.

The length of each groove 21 is set based on the length of the corresponding protrusion 39. Specifically, when the protrusions 39 are fitted into the grooves 21, an end surface of the thermally insulated insert member 30 on the intake-air upstream side (rearward side of the arrow in FIG. 3) becomes flush with an end surface of the cylinder head 10 on the intake-air upstream side (rearward side of the arrow in FIG. 3).

The width of each groove 21 (width of the groove 21 in a direction crossing the frontward-rearward direction shown in FIG. 3) is set based on the width of the corresponding protrusion 39 (width of the protrusion 39 in the direction crossing the frontward-rearward direction shown in FIG. 3), so that the protrusion 39 is tightly fitted into the groove 21.

Each groove 21 of the present embodiment has a semicircular cross-sectional shape in accordance with the cross-sectional shape of the corresponding protrusion 39. This cross-sectional shape of the groove 21 can be other shape such as semi-elliptical or polygonal.

In FIG. 3, each of the reference signs 16 indicates a raised portion for raising the corresponding branch point 15 from an inner wall surface of the corresponding intake port 11, on the intake-air upstream side of the branch point 15.

Returning to FIG. 1, although only a portion of the exhaust port 12 that is near the combustion chamber 22 is shown, the shape of the exhaust port 12 is the substantially same as that of the intake port 11. Specifically, each exhaust port 12 has a pair of upstream openings each having a circular shape and facing the corresponding combustion chamber 22. In addition, although not shown, the exhaust port 12 has a downstream opening having a substantially rectangular shape with four rounded corners in accordance with the shape of an opening of the exhaust manifold on the exhaust-air upstream side.

It should be noted that the present invention is not limited to this exhaust port 12. For example, an exhaust manifold head port (cylinder head-integrated exhaust manifold), in which exhaust ports are aggregated in the cylinder head, can be used.

As shown in FIG. 1, an intake valve 23 is arranged in each intake port 11 to open and close the intake port 11. An exhaust valve 24 is arranged in each exhaust port 12 to open and close the exhaust port 12. These intake valve 23 and exhaust valve 24 are opened and closed at predetermined timing by a not-shown valve driving mechanism having a camshaft and a rocker arm.

Thermally Insulated Insert Member

Next, a description will be given of the thermally insulated insert member 30.

Figure 4:
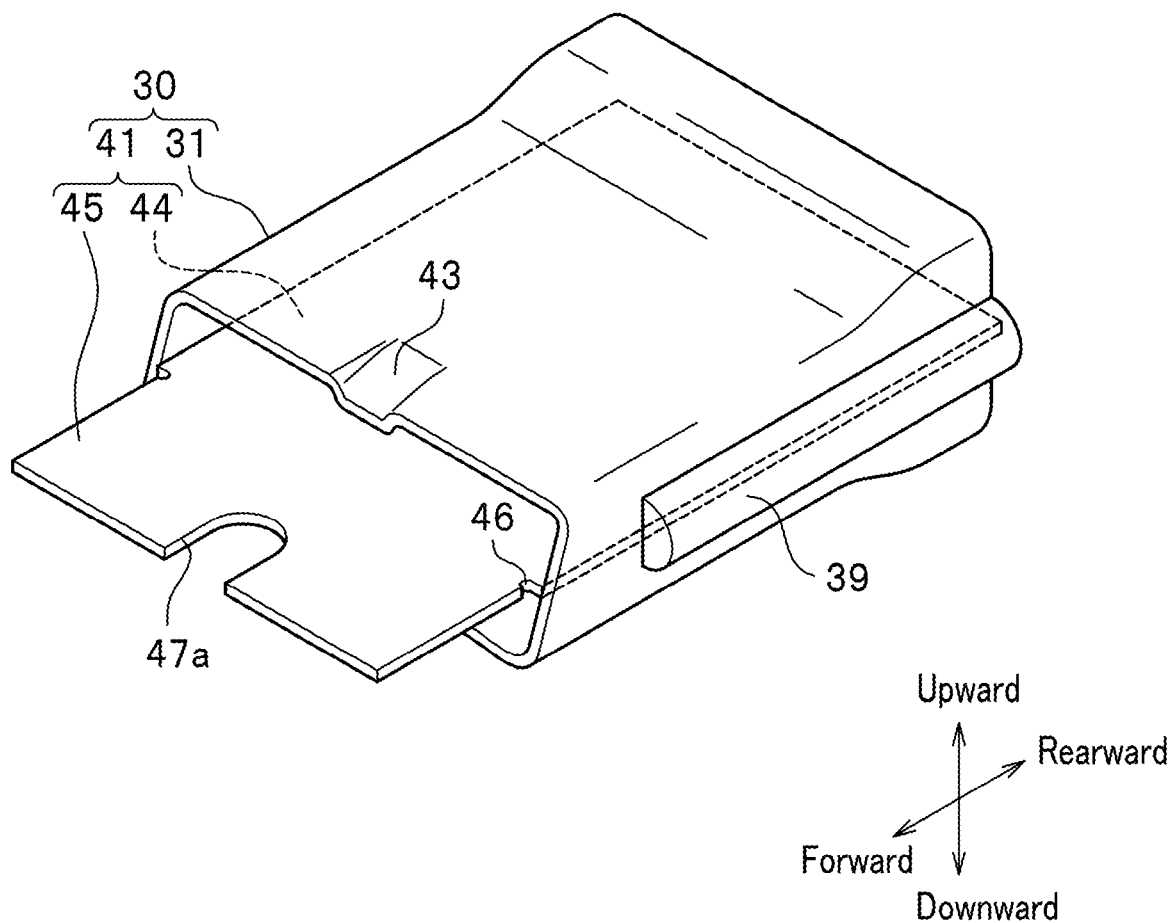
FIG. 4 is a perspective view showing the whole of the thermally insulated insert member.

FIG. 4 is a perspective view showing the whole of the thermally insulated insert member 30. In the explanation given below about the thermally insulated insert member 30, a forward-rearward direction is defined, as shown in FIG. 4, such that the forward direction is toward the downstream of the intake air, which is on the side of the combustion chamber 22 (see FIG. 1), and the rearward direction is toward the upstream of the intake air, which is on the side of the intake manifold 25 (see FIG. 1). In addition, an upward-downward direction of the thermally insulated insert member 30 is defined as indicated with the arrows shown in FIG. 4, which correspond to the upward and downward directions in the vertical direction when the guide member 41 is placed horizontally while maintaining the above-described forward-rearward direction.

As shown in FIG. 4, each thermally insulated insert member 30 has the guide member 41 and a thermally insulative support member 31. Herein, the thermally insulative support member 31 will be described first, and then the guide member 41 will be described.

The thermally insulative support member 31 supports the guide member 41 in the intake port 11 so that the guide member 41 is not in direct contact with the inner wall surface of the intake port 11 (see FIG. 1).

The shape of the thermally insulative support member 31 is not particularly limited so long as the thermally insulative support member 31 is fitted within the intake port 11. Incidentally, as shown in FIG. 1, the thermally insulative support member 31 according to the present embodiment is formed of a tube body with an external shape having the substantially same shape as the shape of the inside of the intake port 11.

Specifically, the thermally insulative support member 31 is formed of a substantially quadrilateral tube body with horizontally-elongated rectangular openings, as shown in FIG. 4.

As described later, this substantially quadrilateral tube body has a width which is substantially constant from the intake-air upstream side to the intake-air downstream side except the protrusions 39 described next. In addition, this substantially quadrilateral tube has a front opening and a rear opening having a larger vertical width than the front opening.

The above mentioned protrusions 39 of the thermally insulative support member 31 are formed in pair so as to extend in the forward-rearward direction on opposite edges of the thermally insulated insert member 30. Incidentally, in FIG. 4, only one of the pair of protrusions 39 is illustrated and illustration of the other is omitted for convenience of illustration.

In FIG. 4, the reference sign 43 indicates a recess for escaping from a corresponding raised portion 16 (see FIG. 3), and the reference sign 47a indicates a substantially V-shaped notched portion that straddles the corresponding branch point 15 (see FIG. 3) without making contact therewith.

Figure 5A:
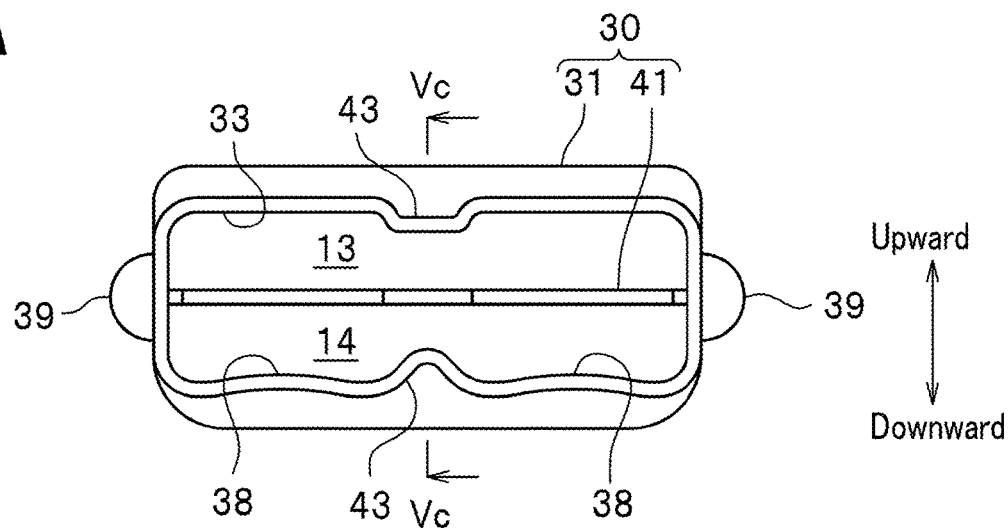
FIG. 5A is a front view of the thermally insulated insert member.
Figure 5B:
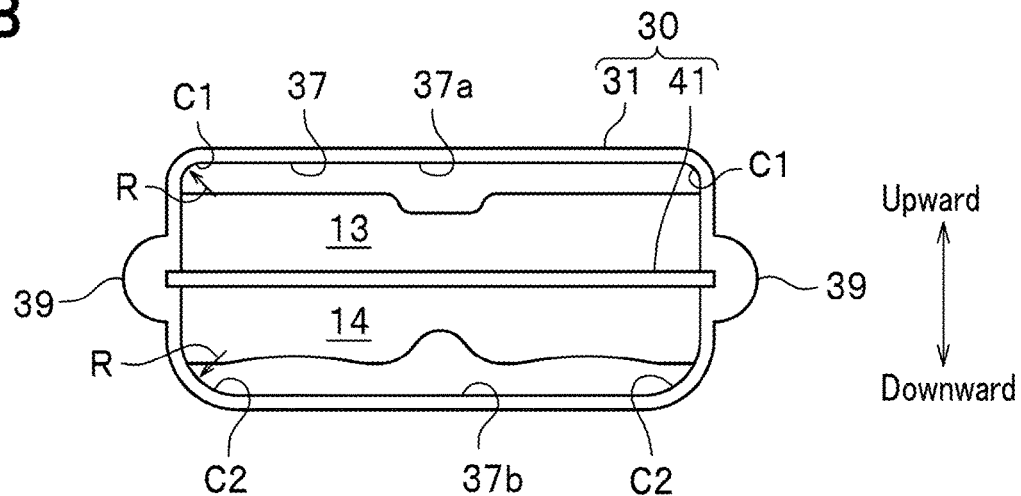
FIG. 5B is a rear view of the thermally insulated insert member.
Figure 5C:
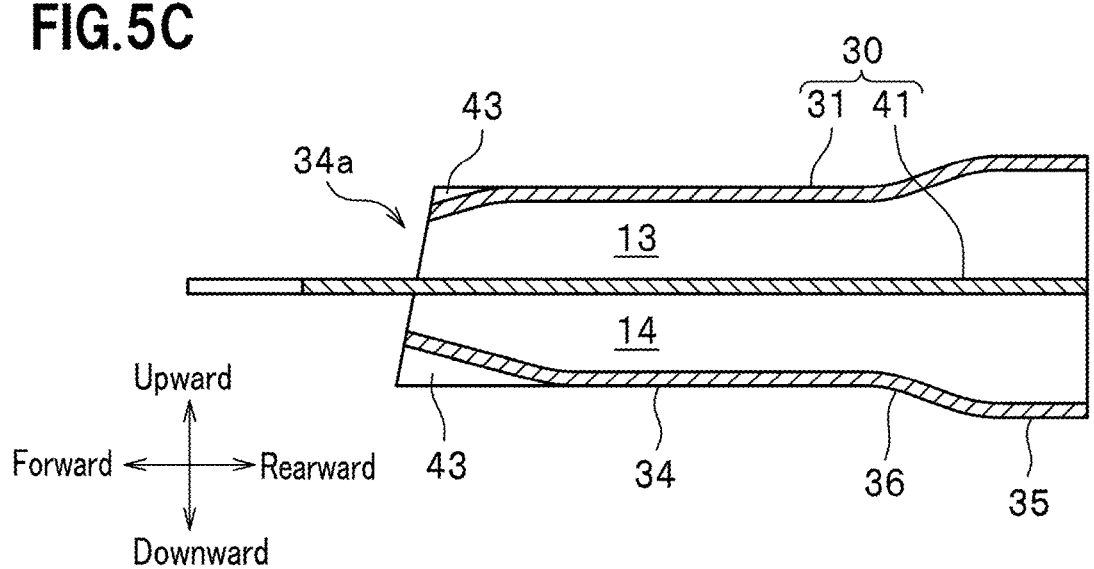
FIG. 5C is a cross-sectional view taken along line Vc-Vc of FIG. 5A.

FIG. 5A is a front view of the thermally insulated insert member 30. FIG. 5B is a rear view of the thermally insulated insert member 30. FIG. 5C is a cross-sectional view taken along line Vc-Vc of FIG. 5A.

As shown in FIGS. 5A and 5B, the thermally insulative support member 31 is formed of the above-described substantially quadrilateral tube body, which has a cross-section having a vertical width and a lateral width larger than the vertical width.

The substantially quadrilateral tube body forming the thermally insulative support member 31 has a thickness which is substantially the same over the whole of the thermally insulative support member 31.

As shown in FIG. 5C, the thermally insulative support member 31 of the present embodiment has a forward tubular portion 34 and a rearward tubular portion 35 having different vertical widths from each other. Specifically, the forward tubular portion 34 has a smaller vertical width than the rearward tubular portion 35. The forward tubular portion 34 occupies a greater part of the thermally insulative support member 31 than the rearward tubular portion 35. Specifically, the forward tubular portion 34 occupies two-thirds or more of the thermally insulative support member 31.

The forward tubular portion 34 forms a portion of the thermally insulative support member 31 that is on the intake-air downstream side relative to the rearward tubular portion 35. Thus, the thermally insulative support member 31 having the forward tubular portion 34 and the rearward tubular portion 35 has a larger vertical width at the intake-air upstream side than the intake-air downstream side.

As shown in FIG. 5C, the thermally insulative support member 31 has a connection tubular portion 36 between the forward tubular portion 34 and the rearward tubular portion 35. This connection tubular portion 36 forms a funnel in side view by having a decreasing vertical width from the rearward tubular portion 35 toward the forward tubular portion 34.

Incidentally, the forward tubular portion 34 and the rearward tubular portion 35 of the present embodiment are each assumed to have a vertical width which is substantially constant along the direction from the intake-air upstream side to the intake-air downstream side, that is, along the direction from the right side to the left side of the drawing sheet of FIG. 5C. However, the forward tubular portion 34 and the rearward tubular portion 35 may each have a vertical width gradually decreasing from the intake-air upstream side toward the intake-air downstream side.

The forward tubular portion 34 of the present embodiment has a forward end portion 34a having an upper portion and a lower portion extending further than the upper portion. In other words, the forward end portion 34a of the forward tubular portion 34 has a shape with an end extending forward and inclining downward in side view.

Incidentally, as shown in FIG. 5C, the lower recess 43 is larger than the upper recess 43 according to the sizes of the upper and lower raised portions 16, 16 shown in FIG. 1.

A downstream opening 33 of the thermally insulative support member 31, shown in FIG. 5A, and an upstream opening 37 of the thermally insulative support member 31, shown in FIG. 5B, each have a substantially rectangular shape with four rounded corners.

As shown in FIG. 5A, the downstream opening 33 of the thermally insulative support member 31 has lower wall surfaces 38, 38 between which the lower recess 43 is located and which are slightly curved upward (toward the inside of the substantially quadrilateral tube body).

As shown in FIGS. 5A to 5C, the thermally insulative support member 31 formed of the substantially quadrilateral tube body thus structured is partitioned in the vertical direction by the guide member 41 formed of a plate described later.

Specifically, the thermally insulative support member 31 has a first intake passage 13 above the guide member 41 and a second intake passage 14 below the guide member 41, inside the thermally insulative support member 31.

Incidentally, an opening of the second intake passage 14 on the intake-air upstream side is opened and closed by a tumble control valve 26 (see FIG. 1), at predetermined timings described later.

As described above, the upstream opening 37 (see FIG. 5B) of the thermally insulative support member 31 has an upper pair of corners C1, C1 and a lower pair of corners C2, C2, and the radius R of the upper pair of corners C1, C1 is smaller than the radius R of the lower pair of corners C2, C2 (see FIG. 5B). Therefore, the opening area of an upstream opening 37a (see FIG. 5B) of the first intake passage 13 is larger than the opening area of an upstream opening 37b (see FIG. 5B) of the second intake passage 14.

The thermally insulative support member 31 thus structured is formed of a synthetic resin with thermal insulation properties. Although the synthetic resin is not particularly limited so long as it is easily molded and has thermal resistance, polyphenylene sulfide (PPS) is most preferable among those having these characteristics.

Next, a description will be given of the guide member 41 (see FIG. 4).

As described above, the guide member 41 guides intake air from the intake manifold 25 (see FIG. 1) toward the combustion chamber 22 (see FIG. 1) in a predetermined direction. The guide member 41 according to the present embodiment serves as a tumble plate that generates a tumble (vertical swirl) in the combustion chamber 22 (see FIG. 1) when the tumble control valve 26 closes the second intake passage 14 (see FIG. 1) as described later.

The guide member 41 is formed of a plate as shown in FIG. 4. The guide member 41 of the present embodiment is assumed to be formed of a metal such as an aluminum alloy. However, it may be formed of a synthetic resin.

As shown in FIGS. 5A to 5C, the guide member 41 is disposed so as to vertically divide the inside of the thermally insulative support member 31 into upper and lower halves. Although not shown, the guide member 41 has opposite edges embedded in the thermally insulative support member 31. With this structure, the guide member 41 is supported by the thermally insulative support member 31 so as to vertically divide the inside thereof.

As shown in FIG. 4, the guide member 41 has a supported portion 44 which is supported by the thermally insulative support member 31 and an extended portion 45 that extends forward from a front end of the thermally insulative support member 31. Incidentally, the supported portion 44 of the guide member 41 of the present embodiment has a forward-rearward direction length longer than that of the extended portion 45. Specifically, the frontward-rearward direction length of the supported portion 44 is, for example, three times or more the frontward-rearward direction length of the extended portion 45.

Figure 6A:
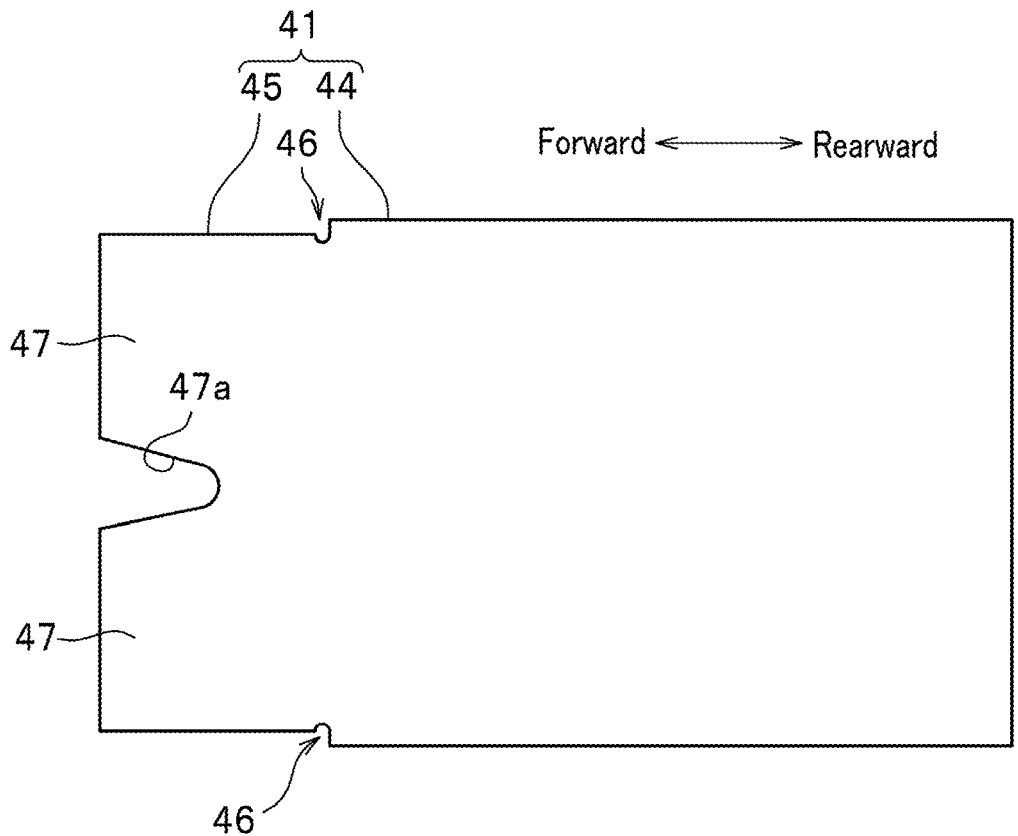
FIG. 6A is a plan view of a guide member.
Figure 6B:
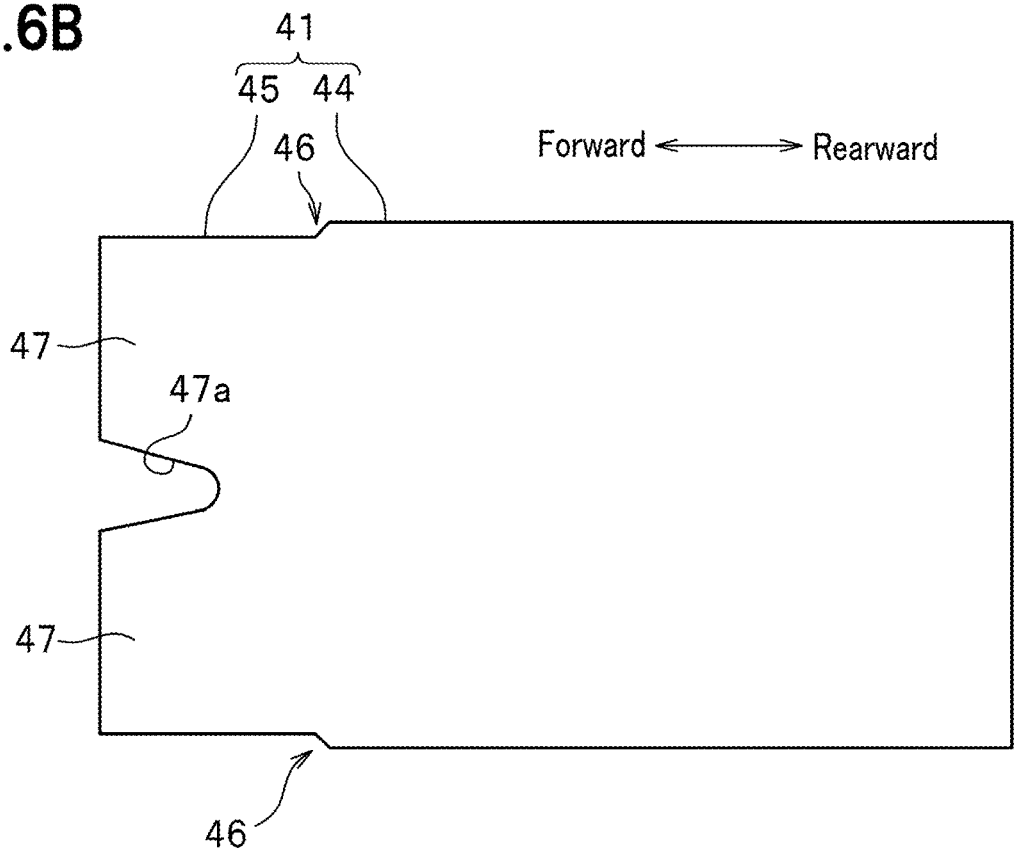
FIG. 6B is a plan view of a modification of the guide member.

FIG. 6A is a plan view of the guide member 41 of the present embodiment. FIG. 6B is a plan view of the guide member 41 according to a modification example. As shown in FIG. 6A, while extending from the supported member 44 disposed in the thermally insulative support member 31 (see FIG. 4), the extended portion 45 is divided at a point spaced apart from the thermally insulative support member 31 into branches correspondingly to the above-described branch passages 20 of the intake port 11 (see FIG. 2). The extended portion 45 of the present embodiment has a pair of branch plates 47.

As shown in FIG. 3, a substantially V-shaped notched portion 47a dividing the extended portion 45 into the pair of branch plates 47 is formed so as to straddle the branch point 15 provided on the intake-air downstream side of the intake port 11. Thus, at least distal end portions of the pair of branch plates 47 are located in the branch passages 20 of the intake port 11 (see FIG. 2).

The supported portion 44, whose opposite edge portions are embedded in the thermally insulative support member 31, is formed to have a larger width than the extended portion 45 taking into account the depths of the embedded portions. Formed between the supported portion 44 and the extended portion 45 are step portions at each of which a stress relaxing portion 46 is provided.

The stress relaxing portion 46 of the present embodiment is formed of a notch having an arc shape in plan view.

The stress relaxing portion 46 is not limited to the arc-shaped notch.

As shown in FIG. 6B, the stress relaxing portion 46 may be formed of an inclined notch connecting between the supported portion 44 and the extended portion 45.

As shown in FIG. 4, the stress relaxing portion 46 of the present embodiment is located forwardly of (on the intake-air downstream side of) the thermally insulative support member 31. However, the stress relaxing portion 46 may be provided in the thermally insulative support member 31 by configuring the supported portion 44 and the extended portion 45 so that the border therebetween is located in the thermally insulative support member 31.

The thermally insulated insert member 30 (see FIG. 4) described above is attached to the cylinder head 10 (see FIG. 2) by being inserted from the upstream opening 17 (see FIG. 2) of the intake port 11 (see FIG. 2).

Specifically, the thermally insulated insert member 30 is attached to the cylinder head 10 by fitting the protrusions 39 of the thermally insulative support member 31 into the grooves 21 of the intake port 11 as shown in FIG. 3.

As shown in FIG. 2, the thermally insulative support member 31 of the thermally insulated insert member 30 attached to the cylinder head 10 is disposed such that a clearance 28 is defined between the cylinder head 10 and the thermally insulative support member 31 except the protrusions 39.

Figure 7:
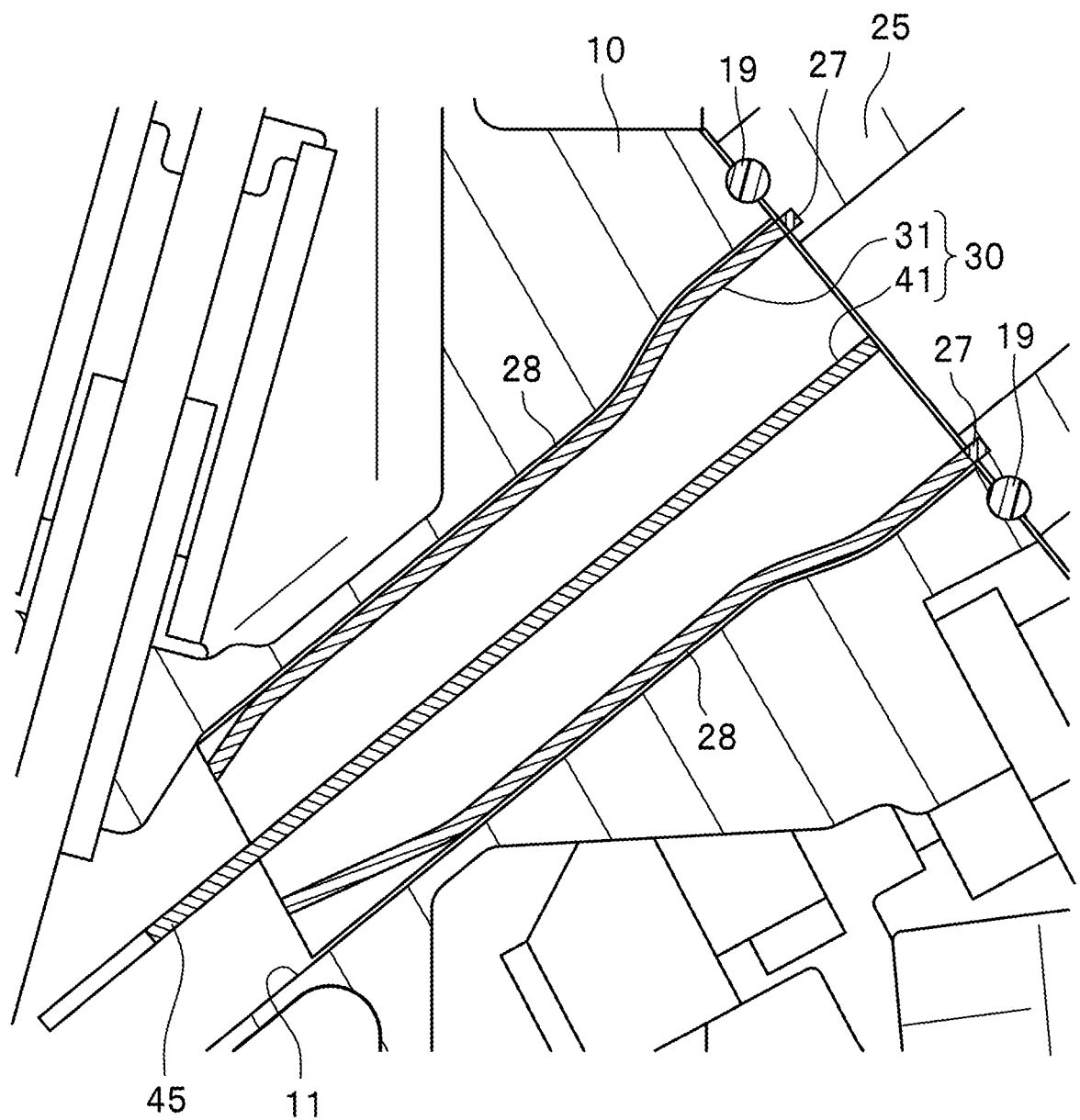
FIG. 7 is a partial enlarged view of the thermally insulated insert member, which is attached to the cylinder head.

FIG. 7 is a partial enlarged view of the thermally insulated insert member 30 attached to the cylinder head 10.

As shown in FIG. 7, the clearance 28 between the thermally insulative support member 31 and the cylinder head 10 is defined over the whole area of the intake port 11 from the intake-air upstream side to the intake-air downstream side of the intake port 11.

Although not shown, the extended portion 45 of the guide member 41 of the present embodiment, which extends out from the thermally insulative support member 31, is not in contact with the inner wall surface of the intake port 11 (including the external surface around the branch point 15).

As shown in FIG. 7, the thermally insulated insert member 30 of the present embodiment is tightly supported in the intake port 11 with the intake manifold 25 abutting an end of the thermally insulative support member 31 on the intake-air upstream side via a press member 27 made of an elastic material such as a rubber. Incidentally, although not shown, the press member 27 may be arranged on end surfaces of the protrusions 39 (see FIG. 3) on the intake-air upstream side.

In FIG. 7, the reference sign 19 indicates a sealing member arranged between the cylinder head 10 and the intake manifold 25. Incidentally, in FIG. 7, illustration of the branch point 15 (see FIG. 2) of the intake port 11 and the tumble control valve 26 (see FIG. 1) is omitted.

Next, a description will be given of operations and advantageous effects of the engine E having the thermally insulated insert members 30 according to the present embodiment.

Figure 8A:
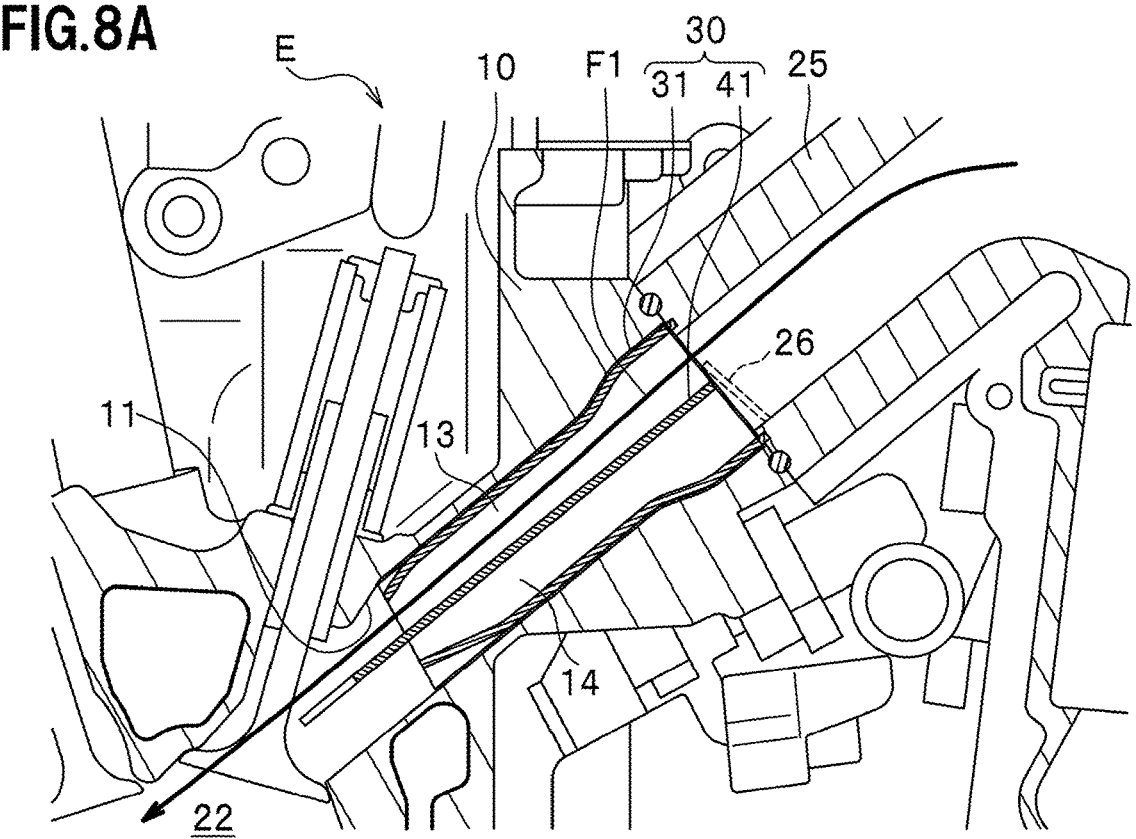
FIGS. 8A and 8B are each a conceptual view showing the flow of intake air flowing through the intake port.
Figure 8B:
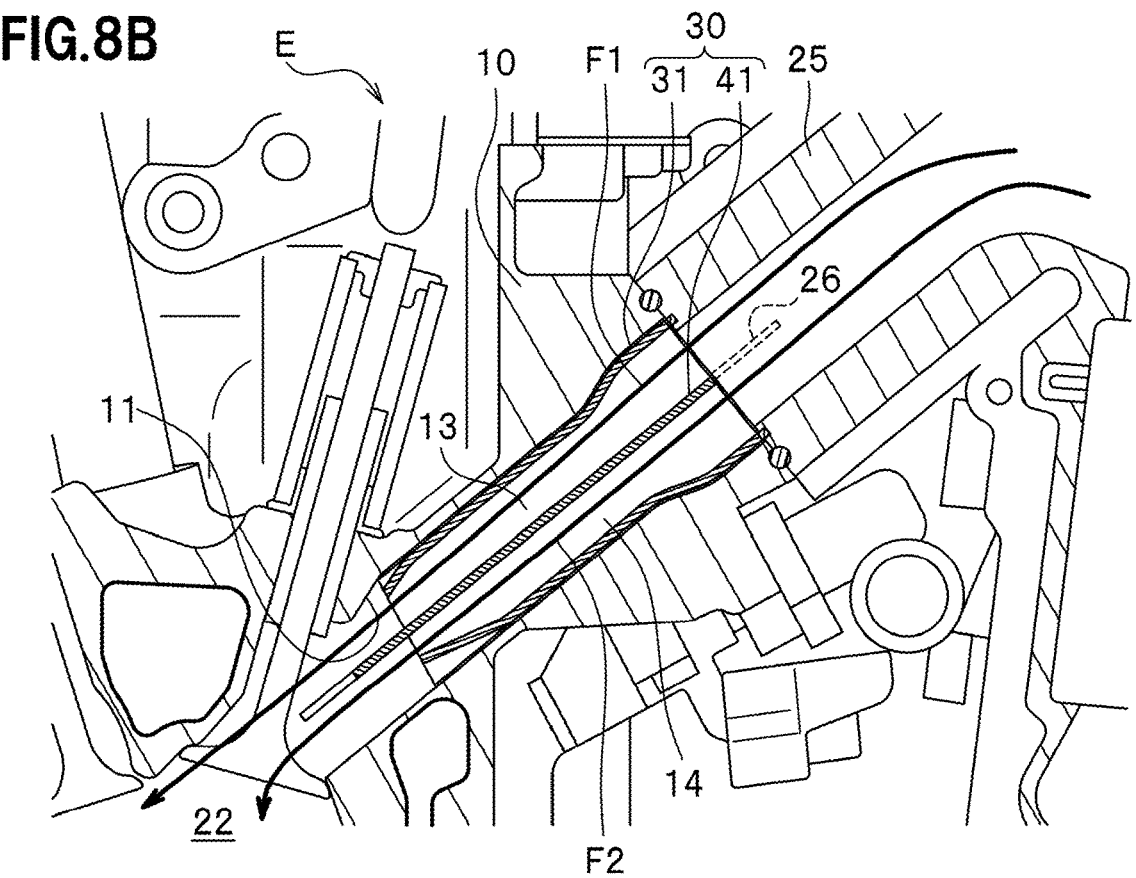

FIGS. 8A and 8B are conceptual diagrams illustrating the intake air flowing from the intake manifold 25 toward the combustion chamber 22. FIG. 8A is a conceptual diagram illustrating the flow of the intake air when the tumble control valve 26 has closed the second intake passage 14. FIG. 8B is a conceptual diagram illustrating the flow of the intake air when the tumble control valve 26 has opened the second intake passage 14.

For example, when the engine E is operated at a low rotational speed (low fuel consumption mode), the second intake passage 14 is closed by the tumble control valve 26 as shown in FIG. 8A. By this operation, intake air F1 flows from the intake manifold 25 via the first intake passage 13 toward the combustion chamber 22. There is no intake air flowing in the second intake passage 14.

It should be noted that this intake air includes fuel injected from an injector not shown.

With this operation, the intake air is supplied to the combustion chamber 22 mainly in a direction inclined with respect to the axial line Ax (see FIG. 1) of the circular columnar space forming the cylinder bore (not shown), as descried above. A tumble (vertical swirl) is generated in the combustion chamber 22 and thereby low fuel consumption driving is performed.

When, for example, the engine E is operated at a high rotational speed, the tumble control valve 26 having closed the second intake passage 14 is opened as shown in FIG. 8B. By this operation, intake air F2 flowing via the second intake passage 14 is supplied into the combustion chamber 22 in addition to the intake air F1 flowing via the first intake passage 13. Because the amount of intake air supplied to the engine E is increased, the engine E is operated with high power.

In the engine E having the thermally insulated insert members 30 according to the present embodiment, the intake ports 11 are thermally insulated when performing the low rotational speed (low fuel consumption mode) operation or the high rotational speed (high output power mode) operation. Specifically, each guide member 41 is disposed in the corresponding intake port 11 via the corresponding thermally insulative support member 31.

Contrastingly, in conventional air intake devices (for example, see patent literature 1 or the like), as described earlier, a tumble plate is attached directly to an inner wall surface of an intake port. Thus, the tumble plate receives heat from a combustion chamber ceiling surface having high temperature via a cylinder head.

With the present embodiment, as the guide member 41 is attached to the intake port 11 via the thermally insulative support member 31, the increase in the temperature of the intake port 11 can be reduced in comparison with the conventional structure. Therefore, according to the present embodiment, the intake charge efficiency can be increased in comparison with the conventional structure.

The guide member 41 of the present embodiment extends further than the thermally insulative support member 31 toward the combustion chamber 22. Therefore, according to the present embodiment, the guide member 41 can have a longer length, and thus the tumble is more efficiently generated in the combustion chamber 22.

The guide member 41 of the present embodiment is a plate, and is arranged such that a plate surface of the guide member 41 extends along a direction in which the intake port 11 extends. Therefore, according to the present embodiment, the pressure loss of the intake air can be reduced and the intake air is stably guided. Therefore, according to the present embodiment, the tumble can be generated in the combustion chamber 22 more reliably.

The thermally insulative support member 31 of the present embodiment is formed of a tube body (substantially quadrilateral tube body) having substantially the same shape as the shape of the intake port 11. Therefore, according to the present embodiment, the amount of the heat transmitted via the inner wall surface of the intake port 11 to the intake port 11 can be reduced.

The thermally insulative support member 31 of the present embodiment is located on the intake-air upstream side with respect to the branch point 15 of the intake port 11. Therefore, according to the present embodiment, the assemblability of the thermally insulative support member 31 to the intake port 11 is improved.

The guide member 41 extends further than the thermally insulative support member 31 and then is divided at a point spaced apart from the thermally insulative support member 31 into the branch plates 47 (see FIG. 3), and at least distal end portions of the branch plates 47 are located in the branch passages 20 (see FIG. 2).

Therefore, according to the present embodiment, the intake air can be stably guided even on the intake-air downstream side of the intake port 11, and the tumble is more reliably generated in the combustion chamber 22.

The guide member 41 of the present embodiment has step portions each between the supported portion 44 and the extended portion 45, at each of which a stress relaxing portion 46 (see FIG. 4) is formed. Therefore, according to the present embodiment, the guide member 41 has good mechanical strength even when flexion occurs on the guide member 41.

The thermally insulative support member 31 formed of the tube body (substantially quadrilateral tube body) of the present embodiment has four corners C1, C1, C2, C2 at the upstream opening 17, wherein the radius R of the upper corners C1, C1 and the radius R of the lower corners C2, C2 are different from each other. Therefore, according to the present embodiment, the vertical relationship of the thermally insulative support member 31 to the intake port 11 can be easily recognized by a user. This structure prevents the thermally insulative support member 31 from being mistakenly attached to the intake port 11, and thus the thermally insulative support member 31 can be efficiently attached to the intake port 11.

In the present invention, at least one of the four corners C1, C1, C2, and C2 may be configured to have a radius R different from others.

The thermally insulative support member 31 formed of the tube body (substantially quadrilateral tube body) of the present embodiment is configured such that the opening area of the upstream opening 37a (see FIG. 5B) of the first intake passage 13 is larger than the opening area of the upstream opening 37b (see FIG. 5B) of the second intake passage 14. Therefore, according to the present embodiment, it is possible to decrease the pumping loss that can be generated in connection with the arrangement of a control shaft (not shown) that opens and closes the tumble control valve 26 (see FIG. 1).

According to the thermally insulated insert member 30 of the present embodiment, the thermally insulative support member 31 is made of a synthetic resin and the guide member 41 is made of a metal. In general, metals have smaller thermal expansion coefficients than synthetic resins. Therefore, according to the present embodiment, the guide member 41 can reduce the deformation of the thermally insulative support member 31 that is caused due to thermal expansion when the thermally insulated insert member 30 is subject to high temperature.

According to the thermally insulated insert member 30 of the present embodiment, the forward end portion 34a (see FIG. 5C) of the forward tubular portion 34 has an end extending forward and inclining downward in side view. In addition, each of the intake ports 11 (see FIG. 1) of the engine E, in which the thermally insulated insert members 30 are respectively disposed, extends in the cylinder head 10 in a direction inclined with respect to the axial line Ax (see FIG. 1) of the circular columnar space forming the cylinder bore (not shown). Therefore, the thermally insulative support member 31 disposed in the intake port 11 can cover the inner wall surface of the intake port 11 without interfering with the intake valve 23 (see FIG. 1). Therefore, according to the present embodiment, the thermal insulation performance for the intake port 11 is further improved.

In the engine E according to the present embodiment, the clearance 28 (see FIG. 7) is defined between the inner wall surface of the intake port 11 and the thermally insulated insert member 30. Therefore, according to the present embodiment, a tolerance for the thermally insulated insert member 30 being deformed in the intake port 11 can be increased. In addition, the clearance 28 reduces the heat transmitted from the inner wall surface of the intake port 11 to the thermally insulative support member 31.

In addition, in the engine E according to the present embodiment, the thermally insulated insert member 30 is inserted into the intake port 11 from the upstream opening 17 thereof. A press member 27 (see FIG. 7) made of an elastic material abuts an end surface of the thermally insulated insert member 30 that faces the upstream opening 17 (see FIG. 2).

Therefore, according to the present embodiment, the thermally insulated insert member 30 is stably disposed in the intake port 11.

Figure 9A:
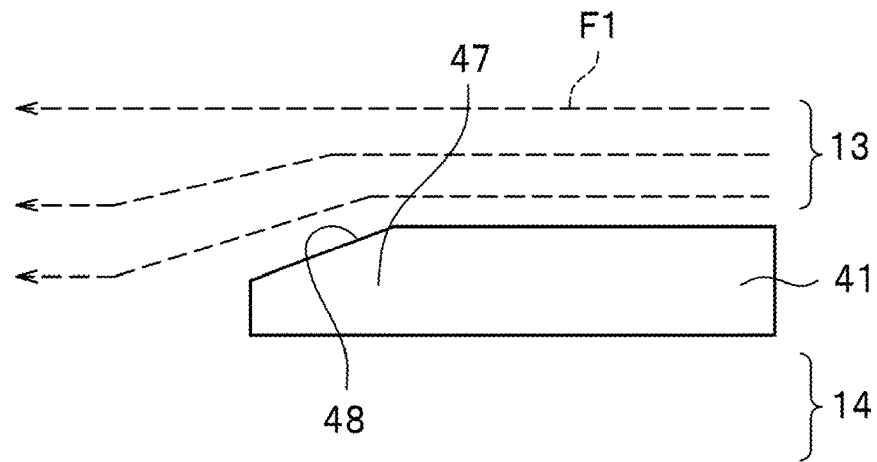
FIGS. 9A to 9C are conceptual views showing the variation in the flow of the intake air caused by guide members with various shapes.
Figure 9B:
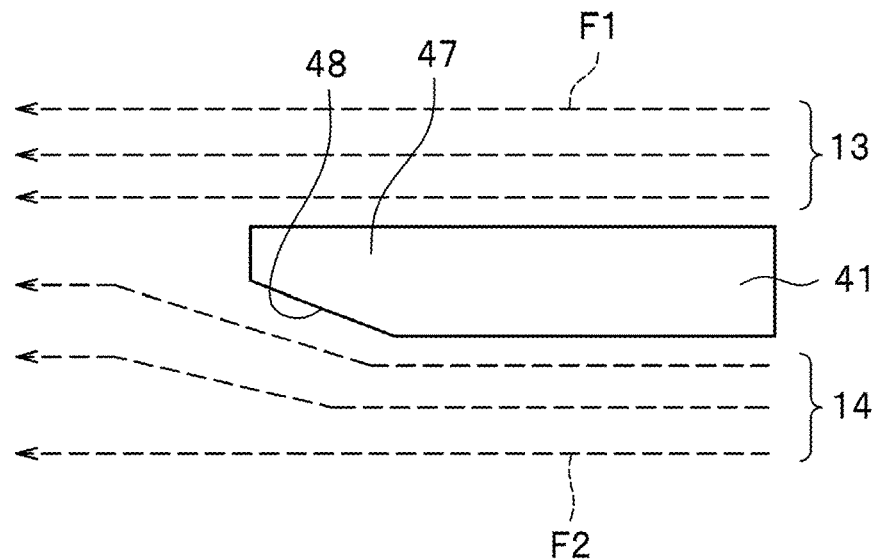
Figure 9C:
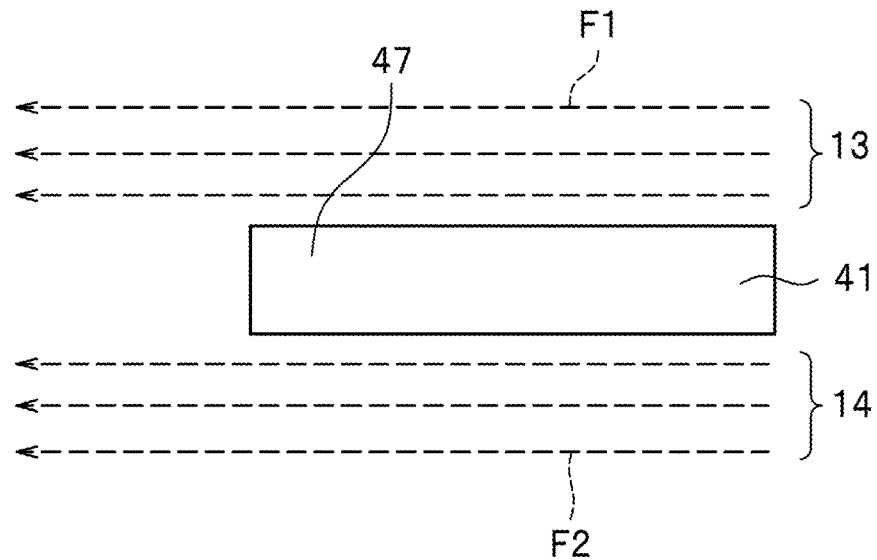

FIGS. 9A to 9C, which will be referred to next, are conceptual diagrams illustrating variations in the intake air F1 and F2 that occur when the shape of the distal end of the guide member 41 (branch plate 47) is changed.

First, the guide member 41 shown in FIG. 9C will be described.

As shown in FIG. 9C, the distal end of the guide member 41 (branch plate 47) does not include an inclined surface 48 (see FIGS. 9A and 9B), unlike the next-described guide members 41 shown in FIGS. 9A and 9B.

Thus, the guide member 41 shown in FIG. 9C creates a space ahead of the guide member 41 where the intake air F1 that flows in the first intake passage 13 and the intake air F2 that flows in the second intake passage 14 do not pass through. This is due to the streamline separation of the intake air F1 and F2 at the forward end surface of the guide member 41.

In contrast, the guide member 41 (branch plate 47) shown in FIG. 9A has a distal end portion with a tapered surface 48 on a side facing the first intake passage 13. This tapered surface 48 is inclined so as to be closer to the second intake passage 14 as it extends toward the intake-air downstream side.

With the guide member 41 thus configured, when the second intake passage 14 is closed by the tumble control valve 26 and only the intake air F1 flows in the first intake passage 13, the intake air F1 does not cause streamline separation at the front portion of the guide member 41, and, as a result, the effective cross-sectional area of the first intake passage 13 is increased.

Therefore, use of the guide member 41 shown in FIG. 9A decreases the pumping loss that can be generated when the tumble control valve 26 closes the second intake passage 14.

Next, the guide member 41 shown in FIG. 9B will be described. This guide member 41 (branch plate 47) has a distal end portion with a tapered surface 48 on a side facing the second intake passage 14. This tapered surface 48 is inclined so as to be closer to the first intake passage 13 as it extends toward the intake-air downstream side.

With this guide member 41 thus structured, when the tumble control valve 26 having closed the second intake passage 14 is opened, the intake air F1 and F2 respectively flow in the first intake passage 13 and the second intake passage 14. In this event, the intake air F2 does not cause streamline separation at the forward portion of the guide member 41, and, as a result, the effective cross-sectional area of the second intake passage 14 is increased. With this, the pumping loss in the intake port 11 can decreased.

In addition, as the straightness of the intake air F1 is satisfactorily maintained in the first intake passage 13, a tumble can be generated in the combustion chamber 22 (see FIG. 1) more effectively.

Although the embodiment of the present invention has been described above, the present invention is not limited to the above embodiment but can be implemented in various forms.

In the above-described embodiment, description has been given of the thermally insulated insert member 30 for generating a tumble in the combustion chamber 22. The thermally insulated insert member 30 of the present invention can also be configured to generate a swirl in the combustion chamber 22 by configuring the guide member 41 to have a plate surface making an angle with respect to an axis along which the intake air flows.

REFERENCE SIGNS LIST 10 cylinder head
11 intake port
12 exhaust port
13 first intake passage
14 second intake passage
15 branch point
16 raised portion
17 upstream opening of intake port
18 downstream opening of intake port
20 branch passage
21 groove
22 combustion chamber
23 intake valve
24 exhaust valve
25 intake manifold
26 tumble control valve (predetermined valve)
27 press member
28 clearance
30 thermally insulated insert member
31 thermally insulative support member
33 downstream opening of thermally insulative support member
34 forward tubular portion
34a forward end portion
35 rearward tubular portion 36 connection tubular portion
37 upstream opening of thermally insulative support member
37a upstream opening of first intake passage
37b upstream opening of second intake passage
39 protrusion
41 guide member
43 recess
44 supported portion
45 extended portion
46 stress relaxing portion
47 branch plate
47a notched portion
48 tapered surface
C1 corner portion
C2 corner portion
E engine

The invention claimed is:

1. A thermally insulated insert member disposed in an intake port of a cylinder head of an engine, the thermally insulated insert member comprising:
a guide member that guides a flow of intake air flowing in the intake port; and
a thermally insulative support member with a shape that can be fitted within the intake port,
wherein the guide member is formed of a metal and is supported in the intake port via the thermally insulative support member,
wherein the guide member extends further than the thermally insulative support member toward a combustion chamber of the engine,
wherein the guide member is a plate, and is arranged such that a plate surface of the guide member extends along a direction in which the intake port extends,
wherein the thermally insulative support member is formed of a tube body with an external shape substantially the same as a shape of the intake port,
wherein the intake port defines a branch point at which the intake port is divided into a plurality of branch passages while extending toward the combustion chamber,
wherein the thermally insulative support member is located on an intake-air upstream side relative to the branch point,
wherein, while extending further than the thermally insulative support member, the guide member is divided at a point spaced apart from the thermally insulative support member into branched portions, correspondingly to the plurality of branch passages, and
wherein at least distal end portions of the branched portions of the guide member are located in the plurality of branch passages.

2. The thermally insulated insert member of claim 1, wherein the thermally insulative support member is formed of a synthetic resin.

3. The thermally insulated insert member of claim 1, wherein the thermally insulative support member has an intake-air downstream side end having an inclined surface that extends toward an intake-air downstream side and inclines downward.

4. An engine provided with the thermally insulated insert member according to claim 1,
wherein a clearance is defined between the intake port and the thermally insulative support member.

5. An engine provided with the thermally insulated insert member according to claim 1,
wherein the thermally insulated insert member has an end surface facing an upstream opening of the intake port, and
wherein the thermally insulated insert member is held in the intake port with a press member which is made of an elastic material and which abuts the end surface of the thermally insulated insert member.

6. A thermally insulated insert member disposed in an intake port of a cylinder head of an engine, the thermally insulated insert member comprising:
a guide member that guides a flow of intake air flowing in the intake port; and
a thermally insulative support member with a shape that can be fitted within the intake port,
wherein the guide member is formed of a metal and is supported in the intake port via the thermally insulative support member,
wherein the guide member is a plate, and is arranged such that a plate surface of the guide member extends along a direction in which the intake port extends,
wherein the plate serving as the guide member partitions the intake port into a first intake passage and a second intake passage,
wherein the second intake passage is able to be opened and closed by a predetermined valve, and
wherein the guide member has an intake-air downstream side end portion having a tapered surface on a side facing the first intake passage, the tapered surface inclining so as to be closer to the second intake passage as the tapered surface extends toward an intake-air downstream side.

7. The thermally insulated insert member of claim 6,
wherein the thermally insulative support member is formed of a tube body with an external shape substantially the same as a shape of the intake port.

8. The thermally insulated insert member of claim 7,
wherein the thermally insulative support member has an intake-air downstream side end having an inclined surface that extends toward an intake-air downstream side and inclines downward.

9. A thermally insulated insert member disposed in an intake port of a cylinder head of an engine, the thermally insulated insert member comprising:
a guide member that guides a flow of intake air flowing in the intake port; and
a thermally insulative support member with a shape that can be fitted within the intake port,
wherein the guide member is formed of a metal and is supported in the intake port via the thermally insulative support member,
wherein the guide member extends further than the thermally insulative support member toward a combustion chamber of the engine,
wherein the guide member is a plate, and includes: a supported portion supported by the thermally insulative support member; and an extended portion extending out from the thermally insulative support member,
wherein the supported portion has a larger width than the extended portion, and
wherein the guide member further includes a step portion between the supported portion and the extended portion, and a stress relaxing portion is formed in the step portion.

10. An engine provided with the thermally insulated insert member according to claim 9, wherein the thermally insulated insert member has an end surface facing an upstream opening of the intake port, and wherein the thermally insulated insert member is held in the intake port with a press member which is made of an elastic material and which abuts the end surface of the thermally insulated insert member.

11. A thermally insulated insert member disposed in an intake port of a cylinder head of an engine, the thermally insulated insert member comprising:

a guide member that guides a flow of intake air flowing in the intake port; and a thermally insulative support member with a shape that can be fitted within the intake port, wherein the guide member is formed of a metal and is supported in the intake port via the thermally insulative support member, wherein the thermally insulative support member is formed of a tube body with an external shape substantially the same as a shape of the intake port, wherein the tube body is a substantially quadrilateral tube body with four corners which are each rounded, and wherein the substantially quadrilateral tube body has an intake-air upstream side end with four rounded corners at least one of which has a different radius R from others.

12. The thermally insulated insert member of claim 11, wherein the guide member is formed of a plate and partitions an inner space of the thermally insulative support member formed of the substantially quadrilateral tube body into a first intake passage and a second intake passage each formed of a substantially quadrilateral tube body, wherein the second intake passage is able to be opened and closed by a predetermined valve, and wherein two of the four rounded corners of the intake-air upstream side end of the substantially quadrilateral tube body are located on the first intake passage and the other two are located on the second intake passage, and the two of the four rounded corners each have a smaller radius R than the other two.

* * * * *